(12) United States Patent
Goern et al.

(10) Patent No.: US 11,288,166 B2
(45) Date of Patent: Mar. 29, 2022

(54) DETERMINING A RECOMMENDED SOFTWARE-STACK FOR A TARGET SOFTWARE ITEM

(71) Applicant: RED HAT, INC., Raleigh, NC (US)

(72) Inventors: Christoph Goern, Bonn (DE); Francesco Murdaca, Milan (IT); Fridolin Pokorny, Modry Kamen (SK); Daniel Riek, South Yarmouth, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/933,504

(22) Filed: Jul. 20, 2020

(65) Prior Publication Data

US 2022/0019516 A1    Jan. 20, 2022

(51) Int. Cl.
*G06F 9/44* (2018.01)
*G06F 11/36* (2006.01)
(Continued)

(52) U.S. Cl.
CPC .......... *G06F 11/3608* (2013.01); *G06F 8/433* (2013.01); *G06F 8/71* (2013.01); *G06N 5/003* (2013.01)

(58) Field of Classification Search
None
See application file for complete search history.

(56) References Cited

U.S. PATENT DOCUMENTS 7,971,187 B2    6/2011 Sanghvi et al.
8,832,647 B2    9/2014 Cope et al.
(Continued)

FOREIGN PATENT DOCUMENTS

WO    2011143455 A1    11/2011

OTHER PUBLICATIONS

Cameron Browne et al., "A Survey of Monte Carlo Tree Search Methods", Mar. 2012 (Year: 2012).*
(Continued)

*Primary Examiner* — Wei Y Zhen
*Assistant Examiner* — Lanny N Ung
(74) *Attorney, Agent, or Firm* — Kilpatrick Townsend & Stockton LLP (57) ABSTRACT

A recommended software-stack can be determined for a target software item. For example, a system can receive an input specifying a target software item and a characteristic of a computing environment in which the target software item is to be executed. The system can then generate software-stack candidates for the target software item, the software-stack candidates having unique configurations of software components. The system can determine a respective score for each software-stack candidate of the software-stack candidates based on the characteristic of the computing environment and a unique configuration of software components forming the software-stack candidate. The system can select a particular software-stack candidate from the software-stack candidates as a recommended software-stack, based on the respective score for the particular software-stack candidate having a predefined attribute. The system can then generate an output indicating the recommended software-stack to enable the recommended software-stack to be included in the computing environment.

20 Claims, 3 Drawing Sheets

(51) Int. Cl.
*G06F 8/41* (2018.01)
*G06F 8/71* (2018.01)
*G06N 5/00* (2006.01)

(56) References Cited

U.S. PATENT DOCUMENTS

| | | |
|---|---|---|
| 9,519,477 B2 | 12/2016 | Champlin-Scharff et al. |
| 10,127,146 B2 | 11/2018 | Moretto et al. |
| 10,922,072 B1* | 2/2021 | Chouinard .............. G06F 8/656 |
| 2007/0214455 A1* | 9/2007 | Williams .............. G06F 9/5072 |
| | | 718/1 |
| 2011/0113424 A1* | 5/2011 | Ewington ............... G06F 8/658 |
| | | 717/178 |
| 2011/0258619 A1 | 10/2011 | Wookey |
| 2012/0284380 A1* | 11/2012 | Anderson, III ........... G06F 8/63 |
| | | 709/223 |
| 2014/0089511 A1* | 3/2014 | McLean ................. H04L 67/10 |
| | | 709/226 |
| 2017/0185382 A1* | 6/2017 | Ranganathan ..... G06Q 30/0269 |
| 2017/0206069 A1* | 7/2017 | Erwin ..................... G06F 8/447 |
| 2018/0314533 A1* | 11/2018 | Azhen .................. G06F 9/5027 |

OTHER PUBLICATIONS

Griff Bilbro, "Stochastic Search", Jan. 1994 (Year: 1994).*
"Introduction to the Machine Learning Stack," Mar. 16, 2019, https://hackernoon.com/introduction-to-the-machine-learning-stack-f5b64bba7602.
"MS Resolver™," Pattern Recognition Systems, Downloaded from Internet on Apr. 3, 2020, http://www.prs.no/MS Resolver/MS Resolver.html.

* cited by examiner

DETERMINING A RECOMMENDED SOFTWARE-STACK FOR A TARGET SOFTWARE ITEM

TECHNICAL FIELD

The present disclosure relates generally to software stacks. More specifically, but not by way of limitation, this disclosure relates to determining a recommended software-stack for a target software item.

BACKGROUND

A software stack is a set of software components configured to work in tandem to produce a result or achieve a common goal. The software components may include operating systems, architectural layers, protocols, run-time environments, databases, libraries, etc., that are stacked on top of each other in a hierarchy, such that at least some of the software components either directly or indirectly depend on others of the software components. For example, two well-known software stacks are LAMP (Linux, Apache, MySQL, and PHP/Perl/Python) and WINS (Windows Server, IIS, .NET, and SQL Server). Software stacks generally include all of the software components needed to run a particular software item (e.g., an application, service, or package), so that no additional software is needed to support the software item. The software components are typically provided together in a bundle for easy and fast installation, even though the software components are often created and maintained by different developers independently of one another.

DETAILED DESCRIPTION

A software item such as a software application can rely on one or more libraries or other dependencies for proper operation. There can be many versions of the software item and many versions of each of these dependencies. Additionally, at least some of the dependencies may in turn have their own dependencies that serve as indirect dependencies of the software item. There can be many versions of those indirect dependencies, and those indirect dependencies may have their own further dependencies. And so on. As a result, there is often a large number of possible combinations of a software item and its dependencies (e.g., direct and indirect dependencies) that can be used in a software stack for the software item. And some of these combinations may perform worse than others. For example, some combinations may introduce defects, assembly problems, or deployment issues that can be time consuming and difficult to identify and resolve. Given the large number of possibilities, it can be challenging to manually identify and test all of the possible combinations of a software item and its dependencies to determine the best software-stack for a software item.

Some examples of the present disclosure overcome one or more of the abovementioned problems via a system that can generate a group of software-stack candidates for a target software item and determine a respective score for each of the software-stack candidates using a scoring function. The scoring function can take into account characteristics of a computing environment in which the target software item is to be executed. The system can then select one of the software-stack candidates from the group as a recommended software-stack based on its corresponding score. In this way, the system can automatically analyze many combinations of the software item and its dependencies to determine a recommended software-stack for the software item that is the best (e.g., most optimal) for the computing environment, relative to the other software-stack candidates in the group.

As one particular example, TensorFlow is a popular Python library for building artificial intelligence or machine learning applications. An analysis of different versions of libraries used by TensorFlow 1.11.0 revealed that there are currently approximately $6.39E\pm27$ possible combinations for a TensorFlow application stack (e.g., the TensorFlow package and possible combinations of libraries on which TensorFlow depends). And this is just for version 1.11.0 of TensorFlow. Another version of TensorFlow, version 2.0.0rc0 released on Aug. 23, 2019, currently has approximately $6.58E+35$ possible combinations of libraries, which is approximately $1E+8$ times more combinations than version 1.11.0. These large numbers just take libraries into account. In practice, TensorFlow runs in a computing environment with various software characteristics (e.g., native libraries and packages, cross-ecosystem dependencies, kernel versions, and driver versions) and hardware characteristics (e.g., a CPU type, GPU type, etc.), all of which add more dimensions to the search space. It would likely be impossible to manually determine and test all of the possible combinations for all of the TensorFlow versions to verify application behavior. Even trying to build and test all of the possible combinations in a more automated fashion using a computer would still be extremely time consuming and resource-intensive.

Some examples of the present disclosure can overcome one or more of the abovementioned problems via a system that can first execute a search algorithm to perform a search on a search space containing many or all possible combinations of a target software item, like TensorFlow, and its dependencies. The search algorithm can be a heuristic search algorithm, such as a Monte-Carlo tree-analysis algorithm or a temporal-difference learning algorithm; a stochastic search algorithm, such as a simulated annealing algorithm; or another type of algorithm. The search algorithm may learn or be guided over time (e.g., between iterations) to more rapidly converge towards solutions, without having to test all of the possible combinations defined in the search space. This type of searching can be referred to as a combinatorial optimization problem, in which a space is searched for a local maximum or minimum that best satisfies an objective function. By solving this combinatorial optimization problem, the system can rapidly determine a group of software-stack candidates that are most likely to yield the best results, where each of the software-stack candidates in the group has a unique combination of the software components in the search space. The group of software-stack candidates may be a relatively small subset of the total number of software-stack combinations that can be generated using all of the software components in the search space. For example, the group may include 100 thousand software-stack candidates, which may be a relatively small subset of the 10 million total possibilities. In this way, the system has significantly reduced the amount of software-stack candidates that will undergo further analysis.

During or after the search process, the system can also determine respective scores for the software-stack candidates using a scoring function. In some examples, the scoring function can take into account hardware and software characteristics of a computing environment in which the target software item is to execute. Additionally or alternatively, the scoring function can take into account security properties of the software item and each of its dependencies. Additionally or alternatively, the scoring function can take into account performance properties of the software item and each of its dependencies. The scoring function may also take into account other factors. Using a scoring function to characterize each of the software-stack candidates in this way can be faster and less resource-intensive than building and testing each of the software-stack candidates to verify application behavior.

After scoring the software-stack candidates, the system can select one of the software-stack candidates from the group as a recommended software-stack based on its corresponding score. For example, the system can select whichever software-stack candidate in the group has the highest score or the lowest score, depending on the scoring function, as the recommended software-stack. The recommended software-stack may be the best software stack for a given computing environment relative to the rest of the software-stack candidates in the group. The system may then transmit an output indicating the recommended software-stack to a user, who may choose to install the recommended software-stack on a computing device.

In some examples, the user can provide input to the system indicating a target software item. The input can also include one or more characteristics of a computing environment in which the target software item will be executed. The system can use those characteristics to determine a respective score for each of the software-stack candidates, since the scoring function may take such characteristics into account (among other factors). The system can then select the recommended software-stack using one or more processes described herein. In this way, the system can determine a recommended software-stack that is the best for the computing environment's specific characteristics, relative to the other software-stack candidates. The system can then output the recommended software-stack, to enable the recommended software-stack to be included (e.g., installed) in the computing environment.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

Figure 1:
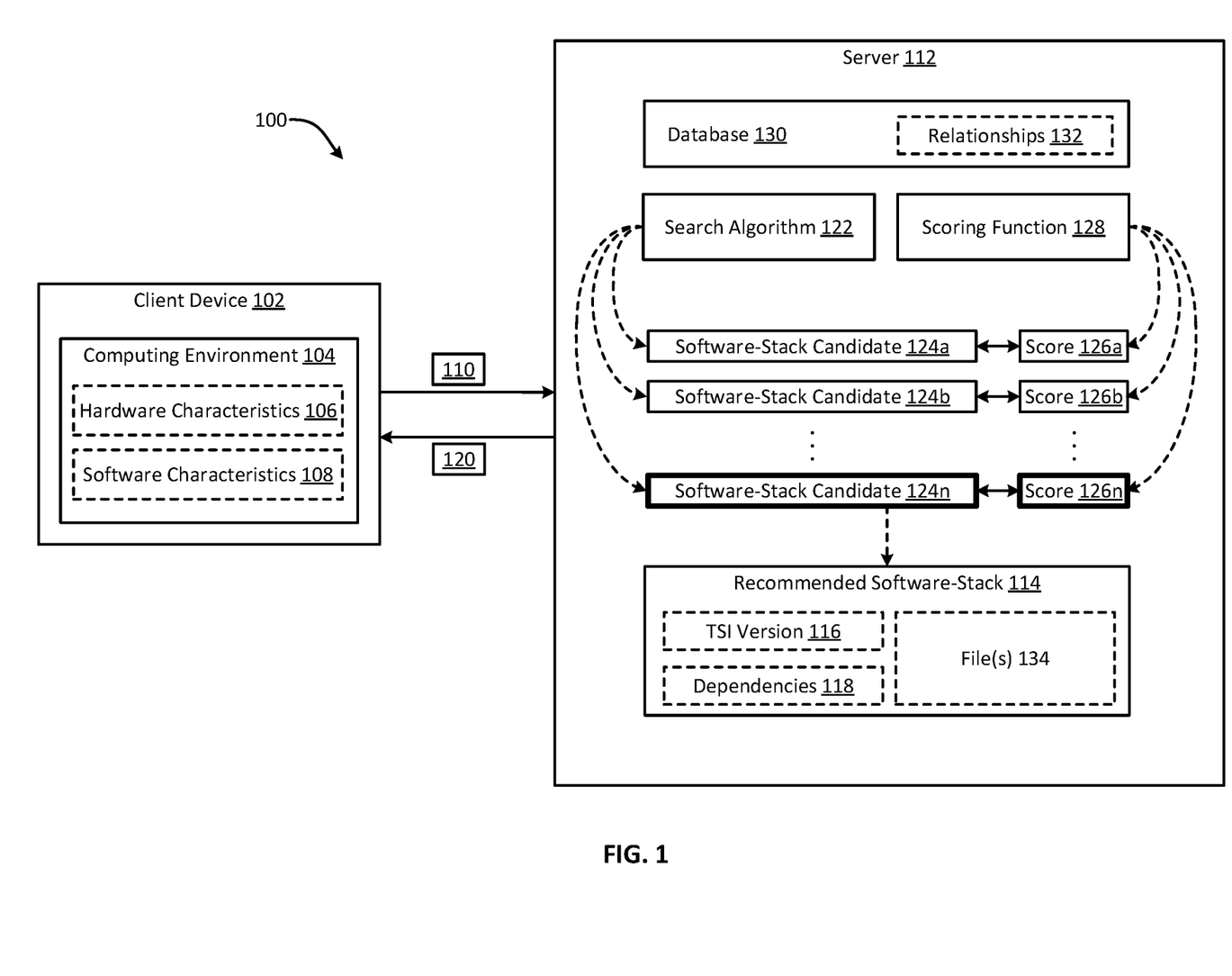
FIG. 1 is a block diagram of an example of a system for determining a recommended software-stack for a target software item according to some aspects of the present disclosure.

FIG. 1 is a block diagram of an example of a system for determining a recommended software-stack for a software item according to some aspects of the present disclosure. The system 100 includes a client device 102, such as a laptop computer, desktop computer, or mobile device (e.g., smartphone, tablet, or e-reader). The client device 102 can include a computing environment 104 for a target software item. Examples of the computing environment 104 can include a runtime environment or a build-time environment. The computing environment 104 may have certain characteristics, such as hardware characteristics 106 and software characteristics 108. Examples of the hardware characteristics 106 can include the number and types of processors, non-volatile memory, and volatile-memory supporting the computing environment 104. Examples of the software characteristics 108 can include the operating system and libraries in the computing environment 104.

In some examples, the client device 102 can transmit a request to a server 112. The request can serve as an input 110 indicating a target software item and a characteristic of the computing environment 104 in which the target software item is to be executed. The input 110 may not include a version indicator for the target software item, but may rather refer to the target software item more generally. The server 112 can receive the input 110 and responsively perform operations to determine a recommended software-stack 114 for the target software item. The recommended software-stack 114 can include a recommended version 116 of the target software item (denoted "TSI Version" in FIG. 1) and one or more recommended dependencies 118 of the target software item, where such dependencies may be direct or indirect dependencies of the target software item. The server 112 can then generate an output 120 indicating the recommended software-stack 114 and provide the output 120 to the client device 102. A user of the client device 102 may receive the output 120 (e.g., via a display of the client device 102) and install the recommended software-stack 114. Alternatively, the client device 102 can automatically install the recommended software-stack 114, in some examples.

To determine the recommended software-stack 114, the server 112 can begin by executing a search algorithm 122. The search algorithm 122 can be a heuristic search algorithm, a stochastic search algorithm, or another type of search algorithm. The search algorithm 122 can be executed to recursively analyze direct and indirect dependencies of the target software item to develop a search space containing various combinations of the target software item and its dependencies. These combinations may include different versions of the target software item and different mixtures and versions of the dependencies. Each element in the search space can correspond to a unique combination of a specific version of the target software item and the dependencies of that version. The search space can then be searched based on an objective function. In some examples, the search algorithm 122 can learn over time (e.g., between iterations) to more rapidly converge towards a solution to the objective function, without having to analyze every element in the search space. This can reduce the practical magnitude of the search space, exponentially reducing the amount of computational time and resources required to perform the search. By performing the search, the server 112 can determine a group of software-stack candidates 124a-n, where each software-stack candidate 124a-n in the group corresponds to a unique combination of the target software item and its dependencies.

As part of the search process, or after performing the search process, the server 112 can determine scores 126a-n corresponding to the software-stack candidates 124a-n using a scoring function 128. The server 112 can determine a respective score for each respective software-stack candidate using the scoring function 128. The scoring function 128 is a predefined algorithm that can take into account a variety of factors. For example, the scoring function 128 can take into account the hardware characteristics 106 and the software characteristics 108 of the computing environment 104, security properties of the target software item, security properties of one or more dependencies of the target software item, performance properties of the target software item, performance properties of one or more dependencies of the target software item, or any combination of these. Other factors may also be used by the scoring function 128. The scoring function 128 may weight some factors more heavily than others. The server 112 can apply the scoring function 128 to each software-stack candidate to determine its corresponding score. It will be appreciated that although the scoring function 128 is depicted in FIG. 1 as being separate from the search algorithm 122 for simplicity, in some examples where the scoring is performed during the search process, the scoring function 128 may be part of the search algorithm 122.

In some examples, the server 112 can determine variable values for the scoring function 128 based on relationships 132 in a predefined database 130. The database 130 can include relationships 132 between (i) software components usable in software stacks, (ii) performance characteristics of the software components, (iii) security characteristics of the software components, and/or (iv) any number of other characteristics of the software components, to determine variable values for the scoring function 128. For example, the database 130 can include relationships 132 between a particular software component, one or more performance characteristics (e.g., latency or responsiveness characteristics) of the particular software component, one or more security characteristics (e.g., bugs or errors) for the particular software component, an/or one or more other characteristics of the particular software component. The server 112 can access the database 130 to determine various characteristics of the particular software component. The server 112 can iterate this process for some or all of the software components forming a particular software-stack candidate 124a to determine the characteristics of those software components. Based on these characteristics and the scoring function 128, the server 112 can determine the score for the software-stack candidate 124a.

After generating the scores 126a-n for the software-stack candidates 124a-n, the server 112 can select one of the software-stack candidates 124a-n as the recommended software-stack 114. In the example shown in FIG. 1, the software-stack candidate 124n has been selected as the recommended software-stack 114, as illustrated by a thicker border around software-stack candidate 124n in FIG. 1. The server 112 can select the software-stack candidate 124n as the recommended software-stack 114 based on its corresponding score 126n having a certain predefined attribute, such as the corresponding score 126n being the maximum or minimum score among all of the scores 126a-n.

The server 112 may also determine other data to include in the recommended software-stack 114, beyond the recommended TSI version 116 and the recommended dependencies 118. For example, the server 112 can determine that one or more files 134 are to be included in the recommended software-stack 114, where the files 134 are different from the target software item and are not dependencies of the target software item. Examples of the files 134 can include binary files and scripts, such as a Python script. The files 134 can be configured to improve a performance characteristic or a security characteristic of the recommended software-stack 114. As one particular example, the server 112 may determine that an update or patch is available to one of the dependencies. The server 112 can determine that the update or patch is available by accessing a website or repository associated with the dependency (e.g., after determining the recommended software-stack 114). Based on determining that the update or patch is available, the server 112 can obtain the update or patch and include it as a file 134 in the recommended software-stack 114.

In some examples, the files 134 can be configured to cooperate with the target software item. That is, even though the files 134 are not dependencies of the target software item, the files 134 can be executed in conjunction with the target software item to achieve a common goal. In some such examples, the server 112 can determine the files 134 by accessing a predefined database (e.g., database 130). The database can include relationships between the target software item and other software components that cooperate with the target software item. The predefined database may be automatically generated, or the predefined database may be manually generated by a developer. The server 112 can search the database for the TSI version 116 and some or all of the dependencies to determine one or more files 134 that cooperate therewith. After determining the files 134, the server 112 can include the files 134 in the recommended software-stack 114.

After determining the recommended software-stack 114, the server 112 can generate an output 120 indicating the recommended software-stack 114. The server 112 can transmit the output 120 to the client device 102 as an electronic communication over a network, such as a local area network or the Internet. The client device 102 can receive the output 120 and perform one or more operations in response to the output 120. For example, the client device 102 can provide the output 120 to a user via a display, which may be a liquid crystal display (LCD) or a light-emitting diode (LED) display. This can enable the user to control the installation of the recommended software-stack 114 in the computing environment 104 manually. As another example, the client device 102 can automatically obtain the necessary files to install the recommended software-stack 114 in the computing environment 104 and automatically perform some or all of the installation process.

While the example that is shown in FIG. 1 depicts a specific number and arrangement of components for simplicity, other examples may include more components, fewer components, different components, or a different arrangement of the components shown in FIG. 1. For instance, in another example the computing environment 104 can be positioned in another location of the system 100, such as on the server 112 or on a computing device that is external to the client device 102. And it will be appreciated that any single component block depicted in FIG. 1 can represent one or more of such components. For example, the client device 102 can represent any number and combination of client devices, the database 130 can represent any number and combination of databases, the scoring function 128 can represent any number and combination of scoring functions, and the search algorithm 122 can represent any number and combination of search algorithms.

Figure 2:
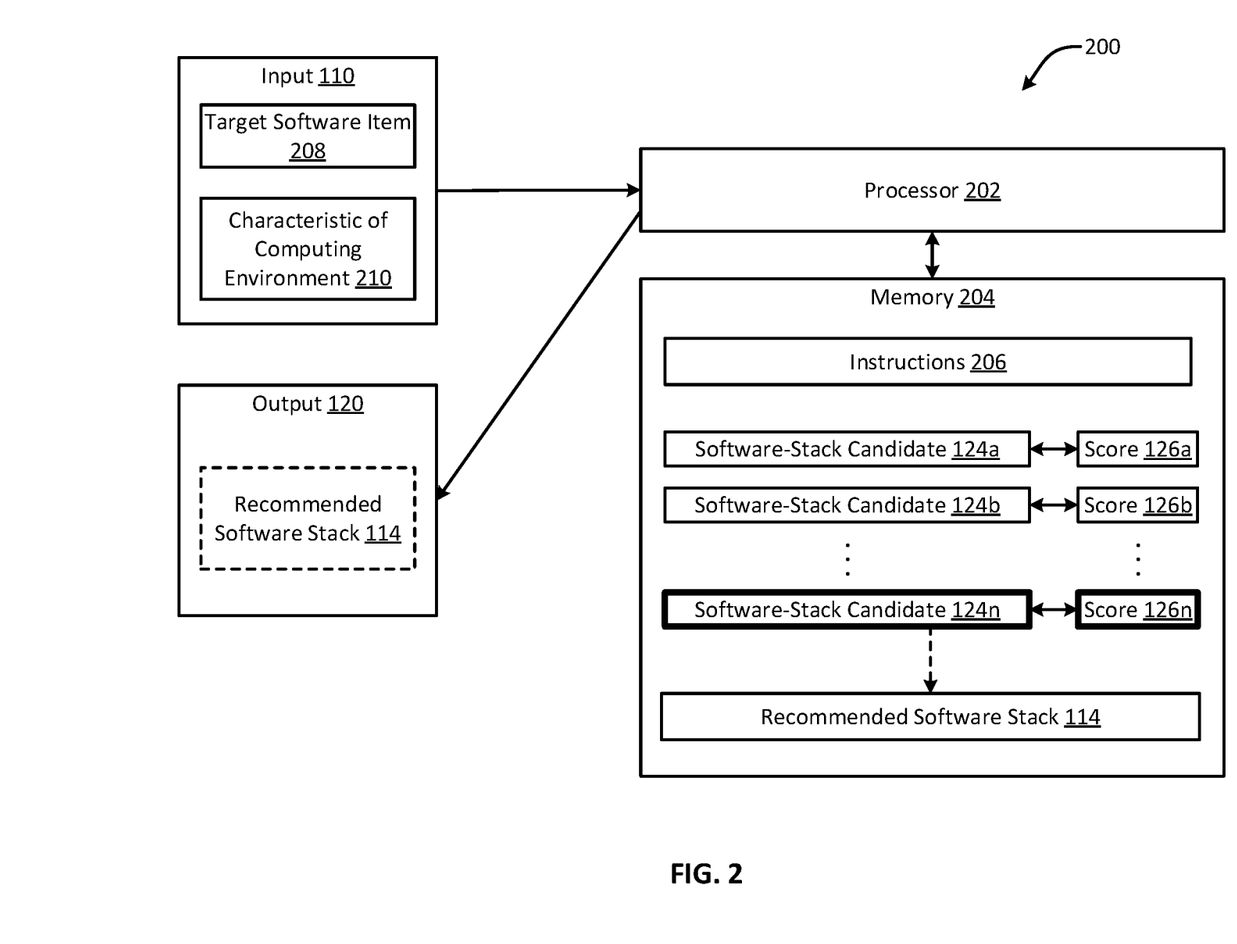
FIG. 2 is a block diagram of another example of a system for determining a recommended software-stack for a target software item according to some aspects of the present disclosure.

FIG. 2 is a block diagram of another example of a system 200 for determining a recommended software-stack for a software item according to some aspects of the present disclosure. The system 200 includes a processor 202 communicatively coupled with a memory 204. In some examples, the processor 202 and the memory 204 can be included in the same housing (e.g., in the server 112 of FIG. 1) or remote from one another.

The processor 202 can include one processor or multiple processors. Examples of the processor 202 include a Field-Programmable Gate Array (FPGA), an application-specific integrated circuit (ASIC), a microprocessor, or any combination of these. The processor 202 can execute instructions 206 stored in the memory 204 to perform operations. In some examples, the instructions 206 can include processor-specific instructions generated by a compiler or an interpreter from code written in any suitable computer-programming language, such as C, C++, C#, etc.

The memory 204 can include one memory or multiple memories. In some examples, the memory 204 can be non-volatile such that it retains stored information when powered off. For instance, the memory 204 can include electrically erasable and programmable read-only memory (EEPROM), flash memory, or any other type of non-volatile memory. At least some of the memory 204 includes a non-transitory computer-readable medium from which the processor 202 can read instructions 206. A non-transitory computer-readable medium can include electronic, optical, magnetic, or other storage devices capable of providing the processor 202 with computer-readable instructions or other program code. Examples of a non-transitory computer-readable medium can include magnetic disk(s), memory chip(s), ROM, random-access memory (RAM), an ASIC, a configured processor, optical storage, or any combination of these.

In some examples, the processor 202 can receive an input 110 specifying a target software item 208 and a characteristic of a computing environment 210 in which the target software item 208 is to be executed. The processor 202 can then generate software-stack candidates 124a-n for the target software item 208. The software-stack candidates 124a-n can have unique configurations of software components. The processor 202 can also determine a respective score for each software-stack candidate of the software-stack candidates 124a-n based on the characteristic of the computing environment 210 and a unique configuration of software components forming the software-stack candidate. The processor 202 can calculate the respective score for each software-stack candidate as part of, or after, a search process for determining the software-stack candidates 124a-n. The processor 202 can select a particular software-stack candidate 124n from the software-stack candidates 124a-n as a recommended software-stack 114. The processor 202 can make this selection based on the respective score 126n for the particular software-stack candidate 124n having a predefined attribute, such as the respective score 126n being the maximum score or the minimum score among all of the scores 126a-n. The processor 202 can then generate an output 120 indicating the recommended software-stack 114, for example, to enable the recommended software-stack 114 to be included in the computing environment.

Figure 3:
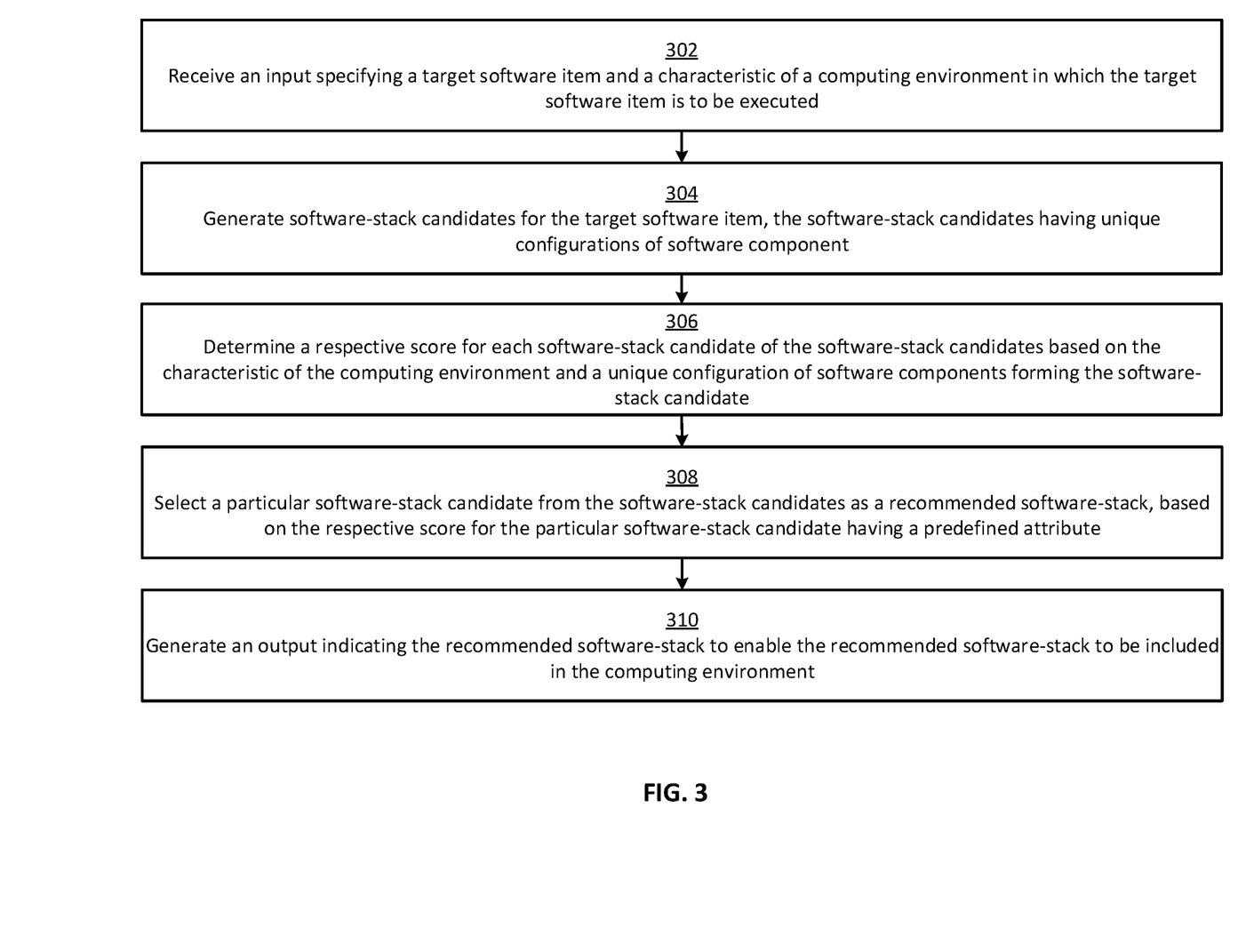
FIG. 3 a flow chart of an example of a process for determining a recommended software-stack for a target software item according to some aspects of the present disclosure.

In some examples, the processor 202 can implement some or all of the steps shown in FIG. 3. Other examples can include more steps, fewer steps, different steps, or a different order of the steps than is shown in FIG. 3. Some or all of the steps may be repeated. The steps of FIG. 3 are discussed below with reference to the components discussed above from FIG. 2.

In block 302, the processor 202 receives an input 110 specifying a target software item 208 and a characteristic of a computing environment 210 in which the target software item 208 is to be executed. The processor 202 can receive the input 110 via an input device, such as a keyboard, mouse, or touchscreen. Alternatively, the processor 202 can receive the input 110 as an electronic communication via a network, such as a local area network or the Internet.

In block 304, the processor 202 generates software-stack candidates 124a-n for the target software item 208. The software-stack candidates 124a-n can have unique configurations of software components. For example, each software-stack candidate can have its own unique configuration of software components. The processor 202 can generate the software-stack candidates 124a-n by executing a search algorithm, such as a heuristic search algorithm or a stochastic search algorithm.

In block 306, the processor 202 determines a respective score for each software-stack candidate of the software-stack candidates 124a-n based on the characteristic of the computing environment 210 and a unique configuration of software components forming the software-stack candidate. The processor 202 can generate the scores 126a-n using a predefined scoring function. Although this step is depicted as sequential to step 304, in some examples the processor 202 can determine the respective score for each software-stack candidate as part of step 304 (e.g., as part of the search process). For example, the scoring function 128 can be used as an objective function during the search process. And each respective score may indicate the amount in which the corresponding software-stack candidate satisfies the objective function.

In block 308, the processor 202 selects a particular software-stack candidate 124n from the software-stack candidates 124a-n as a recommended software-stack 114. The particular software-stack candidate 124n can be selected based on the respective score 126n for the particular software-stack candidate 124n having a predefined attribute. For example, the processor 202 can select as the recommended software-stack 114 whichever of the software-stack candidates 124a-n has a maximum score, a minimum score, or a score with another predefined attribute.

In block 310, the processor 202 generates an output 120 indicating the recommended software-stack 114. This may enable the recommended software-stack 114 to be included (e.g., installed) in the computing environment. In some examples, the output 120 can be a display signal for outputting the recommended software-stack 114 on a display. In other examples, the output 120 can be an electronic communication transmitted over a network to a client device.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, examples described herein can be combined together to yield still further examples.

The invention claimed is:

1. A system comprising:
    a processor; and
    a memory including instructions that are executable by the processor for causing the processor to:
        receive an input from a client device, the input specifying a target software item and specifying a characteristic of a computing environment in which the target software item is to be executed;
        generate software-stack candidates for the target software item by performing a search using a search algorithm configured to recursively analyze direct and indirect dependencies of the target software item, the software-stack candidates having unique configurations of software components including the target software item and dependencies of the target software item;
        determine a respective score for each software-stack candidate of the software-stack candidates based on the characteristic of the computing environment and a unique configuration of software components forming the software-stack candidate;

select a particular software-stack candidate from the software-stack candidates as a recommended software-stack, based on the respective score for the particular software-stack candidate having a predefined attribute; and transmit an output to the client device indicating the recommended software-stack, wherein the client device is operable to install the recommended software-stack in the computing environment.

2. The system of claim 1, wherein the software-stack candidates include different versions of the target software item and different versions of dependencies of the target software item.

3. The system of claim 1, wherein the characteristic of the computing environment is a hardware characteristic or a software characteristic of the computing environment.

4. The system of claim 1, wherein the memory further includes instructions that are executable by the processor for causing the processor to generate the respective score for each respective software-stack candidate among the software-stack candidates using a scoring function configured to account for the characteristic of the computing environment and (i) a performance property of a first software component in the respective software-stack candidate or (ii) a security property of a second software component in the respective software-stack candidate.

5. The system of claim 4, wherein the memory further includes instructions that are executable by the processor for causing the processor to determine the performance property and the security property based on information in a predefined database, the information including relationships between (i) software components usable in software stacks, (ii) performance characteristics of the software components, and (iii) security characteristics of the software components.

6. The system of claim 1, wherein the search is a heuristic search, and wherein the memory further includes instructions that are executable by the processor for causing the processor to determine the software-stack candidates by performing the search using a heuristic search algorithm.

7. The system of claim 6, wherein the heuristic search algorithm is a Monte Carlo tree-search algorithm or a temporal-difference learning algorithm.

8. The system of claim 6, wherein the heuristic search algorithm is configured to recursively analyze the direct and indirect dependencies of the target software item to expand a search space associated with the heuristic search.

9. The system of claim 1, wherein the memory further includes instructions that are executable by the processor for causing the processor to:

determine a recommended file to include in the recommended software-stack, wherein the recommended file is different from the target software item and is not a dependency of the target software item, and wherein the recommended file is configured to improve a performance characteristic or a security characteristic of the recommended software-stack; and include the recommended file in the recommended software-stack.

10. The system of claim 1, wherein the target software item is an individual software application.

11. The system of claim 1, wherein the software-stack candidates include at least 500 software-stack candidates, and wherein the search algorithm is an optimization algorithm configured to iteratively analyze the at least 500 software-stack candidates to determine an optimal software-stack candidate relative to the other software-stack candidates of the at least 500 software-stack candidates, the optimal software-stack candidate serving as the recommended software-stack candidate.

12. A method comprising:

receiving, by a processor and from a client device, an input specifying a target software item and specifying a characteristic of a computing environment in which the target software item is to be executed;

generating, by the processor, software-stack candidates for the target software item by performing a search using an algorithm configured to recursively analyze direct and indirect dependencies of the target software item, the software-stack candidates having unique configurations of software components including the target software item and dependencies of the target software item;

determining, by the processor, a respective score for each software-stack candidate of the software-stack candidates based on the characteristic of the computing environment and a unique configuration of software components forming the software-stack candidate;

selecting, by the processor, a particular software-stack candidate from the software-stack candidates as a recommended software-stack, based on the respective score for the particular software-stack candidate having a predefined attribute; and transmitting, by the processor, an output to the client device indicating the recommended software-stack, wherein the client device is operable to install the recommended software-stack in the computing environment.

13. The method of claim 12, wherein the software-stack candidates include different versions of the target software item and different versions of dependencies of the target software item.

14. The method of claim 12, further comprising generating the respective score for each respective software-stack candidate among the software-stack candidates using a scoring function configured to account for (i) the characteristic of the computing environment, (ii) a performance property of a first software component in the respective software-stack candidate, and (iii) a security property of a second software component in the respective software-stack candidate.

15. The method of claim 14, further comprising determining the performance property and the security property based on information in a predefined database, the information including relationships between (i) software components usable in software stacks, (ii) performance characteristics of the software components, and (iii) security characteristics of the software components.

16. The method of claim 12, wherein the predefined attribute involves the respective score for the particular software-stack candidate being a maximum score or a minimum score among a plurality of scores corresponding to the software-stack candidates.

17. The method of claim 12, further comprising determining the software-stack candidates by performing the search using a heuristic search algorithm.

18. The method of claim 12, further comprising determining the software-stack candidates by performing the search using a stochastic search algorithm.

19. The method of claim 12, further comprising:

determining a recommended file to include in the recommended software-stack, wherein the recommended file is different from the target software item and is not a dependency of the target software item, and wherein the recommended file is configured to improve a performance characteristic or a security characteristic of the recommended software-stack; and including the recommended file in the recommended software-stack.

20. A non-transitory computer-readable medium comprising program code that is executable by a processor for causing the processor to:

receive an input specifying a target software item and specifying a characteristic of a computing environment in which the target software item is to be executed;

generate software-stack candidates for the target software item by performing a search using a search algorithm configured to recursively analyze direct and indirect dependencies of the target software item, the software-stack candidates having unique configurations of software components including the target software item and dependencies of the target software item;

determine a respective score for each software-stack candidate of the software-stack candidates based on the characteristic of the computing environment and a unique configuration of software components forming the software-stack candidate;

select a particular software-stack candidate from the software-stack candidates as a recommended software-stack, based on the respective score for the particular software-stack candidate having a predefined attribute; and cause the recommended software-stack to be included in the computing environment.

\* \* \* \* \*